(12) United States Patent
Robinson et al.

(10) Patent No.: US 8,707,852 B2
(45) Date of Patent: Apr. 29, 2014

(54) CANTILEVER FEEDBACK MECHANISM FOR A PROPORTIONAL BELLOWS ASSEMBLY

(75) Inventors: Cam B. Robinson, Sherwood Park (CA); Jason Gray, Beaumont (CA)

(73) Assignee: Dyna-Flo Control Valve Services Ltd., Edmonton (CA)

( * ) Notice: Subject to any disclaimer, the term of this patent is extended or adjusted under 35 U.S.C. 154(b) by 687 days.

(21) Appl. No.: 13/031,085

(22) Filed: Feb. 18, 2011

(65) Prior Publication Data
US 2011/0197753 A1  Aug. 18, 2011

Related U.S. Application Data

(60) Provisional application No. 61/305,592, filed on Feb. 18, 2010.

(51) Int. Cl.
*F01B 19/00* (2006.01)
*F16J 3/00* (2006.01)

(52) U.S. Cl.
USPC ............................. 92/37; 92/40; 92/41; 92/43

(58) Field of Classification Search
USPC ........... 92/37, 34, 40, 41, 43, 44, 130 B, 133; 73/729.1
See application file for complete search history.

(56) References Cited

U.S. PATENT DOCUMENTS

| 2,816,562 | A | | 12/1957 | Dyson |
| 3,709,088 | A | | 1/1973 | Pitzer |
| 3,716,251 | A | * | 2/1973 | Klees .......................... 280/6.159 |
| 3,724,275 | A | * | 4/1973 | Battaglini et al. .............. 73/716 |
| 4,509,403 | A | | 4/1985 | Gassman |
| 2007/0209703 | A1 | | 9/2007 | Neumann |
| 2008/0078448 | A1 | * | 4/2008 | Gassman et al. ................ 137/85 |
| 2008/0078449 | A1 | | 4/2008 | Pesek |
| 2009/0127488 | A1 | | 5/2009 | McCarty |

* cited by examiner

*Primary Examiner* — Nathaniel Wiehe
*Assistant Examiner* — Daniel Collins
(74) *Attorney, Agent, or Firm* — Christensen O'Connor Johnson Kindness PLLC

(57) ABSTRACT

A cantilever feedback mechanism includes an upper cantilever and a lower cantilever. The upper cantilever and lower cantilever have a resistance spring rate to facilitate movement of the bellows over a selected range of resistances. The upper cantilever has downwardly oriented upper cantilever stops. The lower cantilever has upwardly oriented lower cantilever stops that engage the upper cantilever stops. Mean are provided for applying a preload to maintain the lower cantilever stops and the upper cantilever stops engaged until a force urging movement exceeds the preload.

5 Claims, 6 Drawing Sheets

CANTILEVER FEEDBACK MECHANISM FOR A PROPORTIONAL BELLOWS ASSEMBLY

FIELD

There is described an improved form of cantilever feedback mechanism for use in a proportional bellows assembly used in pneumatic controls for pneumatic instruments.

BACKGROUND

In a process control system that uses pneumatic instrumentation it is very common to use a bellow as a means of providing movement for a feedback control signal. Movement of the bellows must be adjustable to facilitate a range of feedback to allow the user to control the sensitivity of the instrument. A common approach is to use an adjustable valve, proportional valve that will divert or split the feedback signal from the control loop allowing an adjustment of the pressure sent to the bellow by venting the balance to atmosphere. Simply put the control loop feedback pressure to the bellow is regulated by increasing or decreasing exhaust volume through the proportional valve. This design is very effective because it provides a wide range of pressure to the bellow and facilitates very low pressure settings required for the zero movement of the bellows. The challenge of mechanical means of limiting bellow movement is to provide a resistance of the forces introduced by the control loop signal pressure inside the bellow that has a similar range of adjustability to the pneumatic proportional valve. As well, if the design is to be applicable to a variety of applications, it must be universal in design.

In a process control system where a proportion valve is used it is most often set where 60-80 percent of the feedback control loop signal is exhausted to atmosphere allowing a higher level of sensitivity for the instrument. Because of this high exhaust rate many users have to account for this gas loss by using larger gas compressors. In remote locations where the Natural Gas is utilized as an instrument supply there is a significant cost as well as an environmental impact associated with this design.

United States Patent Application 2008/0078449 (Pesek), entitled "Low Consumption Pneumatic Controller," discloses a pneumatic instrument that has a proportional bellows assembly which has an upper bellows and a lower bellows. The upper bellows is connected to control pressure. The lower bellows is vented to atmosphere. During operation, changes in control pressure cause an expansion or contraction of the upper bellows. The lower bellows provides a counteracting feedback force to counteract control pressure changes and equalize any resulting force differential in the proportional bellows assembly. In order to provide "tuning" or optimization of the proportional bellows response, a cantilever feedback mechanism is provided that provides proportional band adjustment. This proportional band adjustment is based upon a reduction of any minor motion or hysteresis within the proportional bellows assembly. When operating as intended, the cantilever feedback mechanism provides a proportional adjustment in response to minor movement, without exhausting supply fluid to the surrounding atmosphere. In order to improve functioning of such devices there is a need for an improved cantilever feedback mechanism.

SUMMARY

There is provided a cantilever feedback mechanism which includes an upper cantilever and a lower cantilever. The upper cantilever and lower cantilever have a resistance spring rate to facilitate movement of the bellows over a selected range of resistances. The upper cantilever has downwardly oriented upper cantilever stops. The lower cantilever has upwardly oriented lower cantilever stops that engage the upper cantilever stops. Means are provided for applying a preload to maintain the lower cantilever stops and the upper cantilever stops engaged until a force urging movement exceeds the preload.

After experimenting with a variety of cantilever configurations, it was determined that without a preload hysteresis was unavoidable. The above described cantilever feedback mechanism with opposing stops was developed to enable preload to be applied.

The performance of the cantilever feedback mechanism is improved when the upper cantilever and the lower cantilever are identical in shape and spring rate. When there is a difference the movement becomes non-linear, which effects the accuracy of the set point.

While there may be different ways of applying a preload, beneficial results may be obtained by positioning spacers between the lower cantilever and the upper cantilever at a central position and at an end remote from a bellows mounting end. The preload is determined by the length of the spacers. The spacers are shorter in length than the combined length of the upper cantilever stops and the lower cantilever stops.

The spacers also play a role in determining the resistance spring rate of the upper cantilever and the lower cantilever as they form part of an adjuster assembly. The resistance spring rate is adjusted by a central spacer which is moved and fixed in positioning by loosening and tightening a fastener within a slot in both the upper cantilever and the lower cantilever to provide an adjustable resistance. It will be understood that the resistance is greater as the spacer is moved closer to a bellows mounting end of the upper cantilever and the lower cantilever.

For greater accuracy, it is preferred that the upper cantilever stops and the lower cantilever stops are located perpendicular to a centerline of the adjuster assembly on a diametrical centerline of a bellows diameter of a bellows assembly to allow resistance forces to be uniform and not change a natural linear movement of the bellows assembly.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
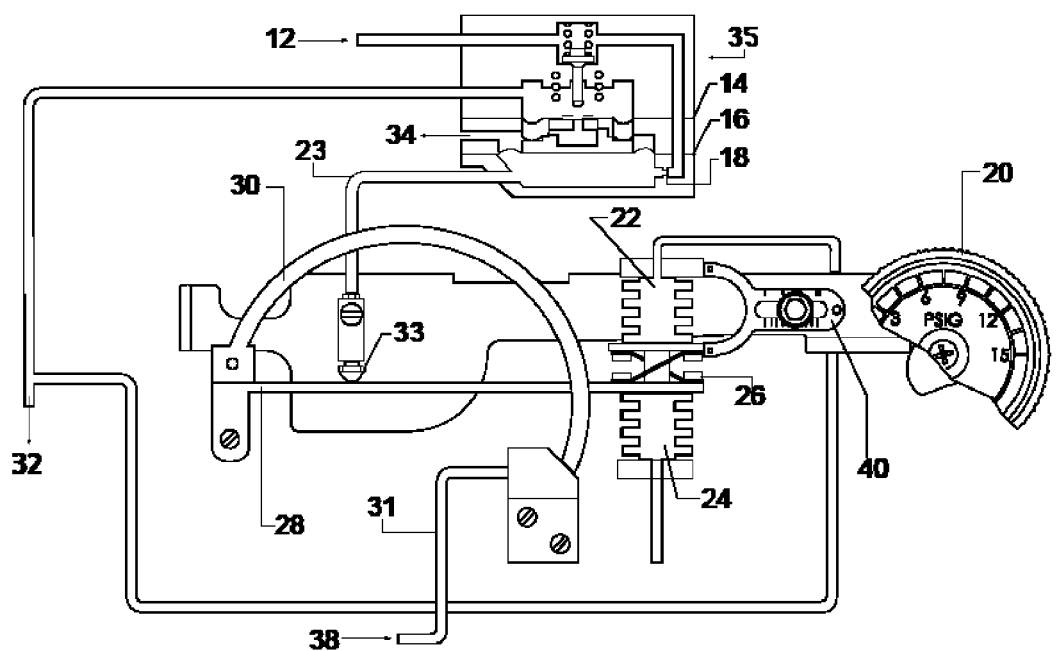
FIG. 1 is a schematic view of a pneumatic instrument equipped with a cantilever feedback mechanism.
Figure 1A:
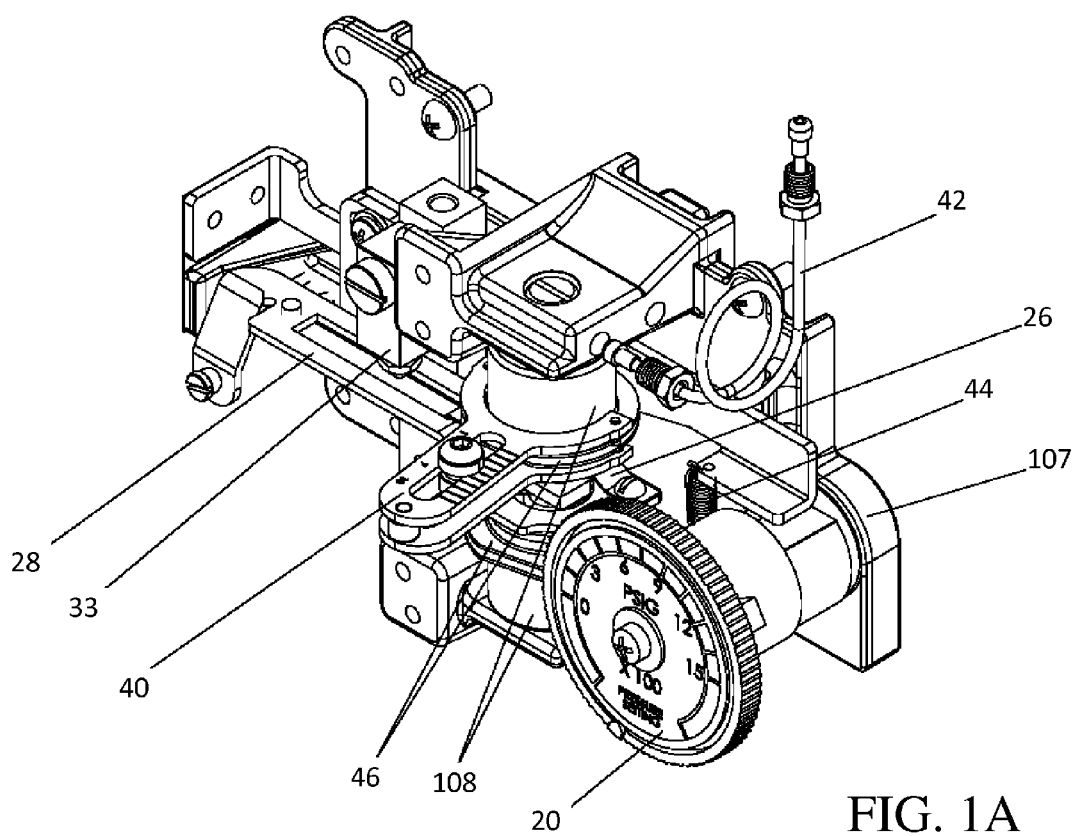
FIG. 1A is a perspective view of a pneumatic instrument equipped with the cantilever feedback mechanism of FIG. 1.

In the example shown in FIG. 1, a pneumatic pressure controller uses a mechanical means of adjusting the feedback element within a pneumatic feedback loop. Referring to FIG. 1A, mechanical means are attached to base 107. Use of the mechanical means replaces the pneumatic means and significantly reduces the use of supply gas. The example illustrated in FIG. 1 shows the primary feedback loop pressure sensing element, bourdon tube 30, connected to the process line 31. The bourdon tube 30 expands with an increase in process pressure 38. The expansion of the bourdon tube 30 connectively moves a flapper 28 closer to a nozzle 33. The nozzle 33 has a constant gas flow 12 supplied by the relay assembly, generally referenced as 35, via the relay tube 23. A fixed orifice 18 helps to ensure a constant flow. The gas pressure at the nozzle orifice 33 remains constant until the flapper 28 moves in relation to the nozzle 33. When the flapper 28 proximity to the nozzle 33 relationship changes the subsequent pressure change at the nozzle orifice 33 is transmitted back through the relay tube 23 to the relay assembly 35 where it acts against a diaphragm 14 and 16 effectively causing an output pressure change signal to the control element, not shown, through air output 32. Exhaust 34 created in relay assembly 35 is allowed to exit the assembly 35. Absolute adjustment, a pressure setting control 20, of the flapper 28 and nozzle 33 relationship is provided to establish a predetermined set point. Referring to FIG. 1, a secondary feedback loop pressure sensing element, bellows 22 and 24 with cross springs 26, provide means, output proportional tubing 42 shown in FIG. 1A, of adjusting the sensitivity of the primary feedback loop by opposing the movement of the primary sensing element, bourdon tube 30. A return spring 44 biases flapper 28 towards a spaced relation with nozzle 33. Referring to FIG. 1, one knowledgeable about the products used within the industry would appreciate that the use of bellows 22 and 24 as a secondary feedback loop sensing element is widely used in the design of pneumatic controllers. Referring to FIG. 1A, bellows caps 46 and 108 surround bellows 22 and 24 and an adjustment cantilever assembly 40 is used to control movement of bellows 22 and 24.

Figure 2:
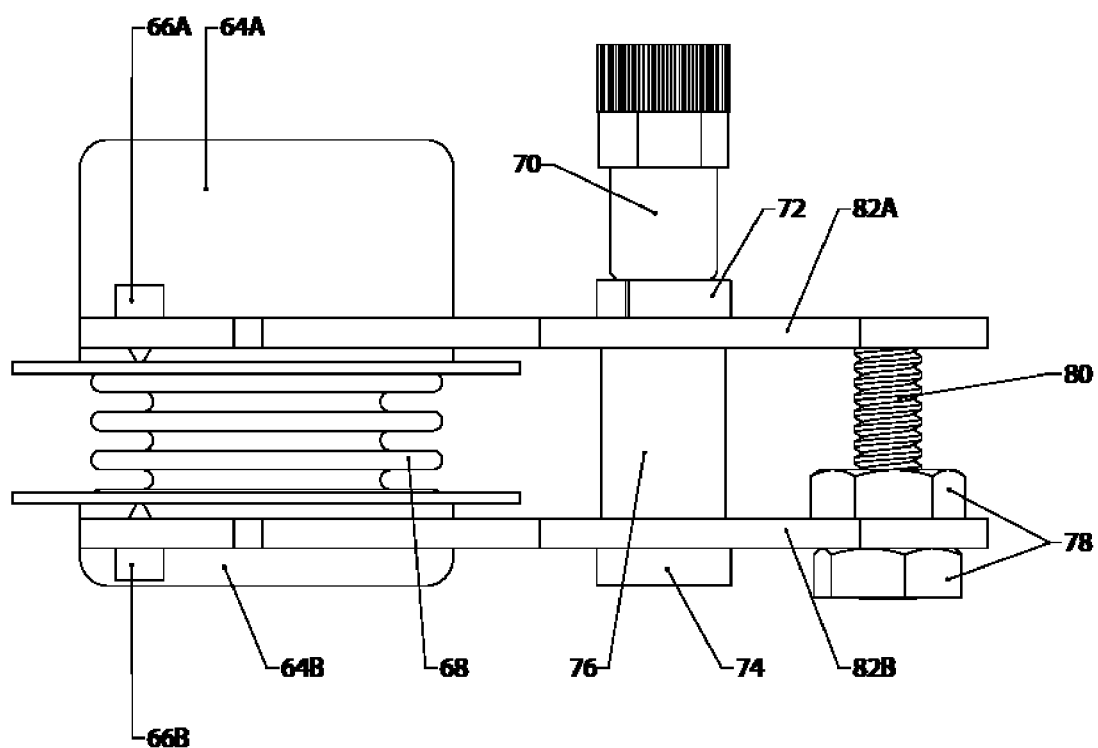
FIG. 2 is a side elevation view perspective view of an unacceptable early embodiment of cantilever feedback mechanism.

In an alternative design, FIG. 2 illustrates a dual cantilever installed on a bellows assembly. The challenge of mechanical means of limiting bellows 22 and 24 movement is to provide a resistance of the forces introduced by the control loop signal pressure inside the bellows 22 and 24 that has a similar range of adjustability to the pneumatic proportional valve. The cantilevers 82A and 82B are manufactured to a specific spring rate to correspond with the effective area of the bellows 68. The spacer 76 is moved and fixed by loosening and tightening the thumb screw 70 within the slot of the cantilevers 82A and 82B to provide an adjustable resistance. The resistance is greater as it is moved closer to the bellows 68. A spacing screw 80 may be tightened or loosened using jam nuts 78 and acts as an end spacer for cantilevers 82A and 82B. Two cantilever pins 66A and 66B are formed with a 60 degree point that is nested within corresponding holes in the bellows flange 64A and 64B. One skilled in the art would appreciate that a slight compression of the bellows is required to contain the two cantilever pins 66A and 66B in their nested positions. Accordingly the spacer 76 length is adjusted to achieve the correct spacing. Although this design achieves a range of adjustability it does not provide enough spring force to completely overcome the force of the bellows under normal operating conditions. Even when the spring rates of the cantilevers are increase by 100% and the thumb screw 70 adjusted to highest resistance the resulting movement is not low enough to provide the required functionality.

Figure 3:
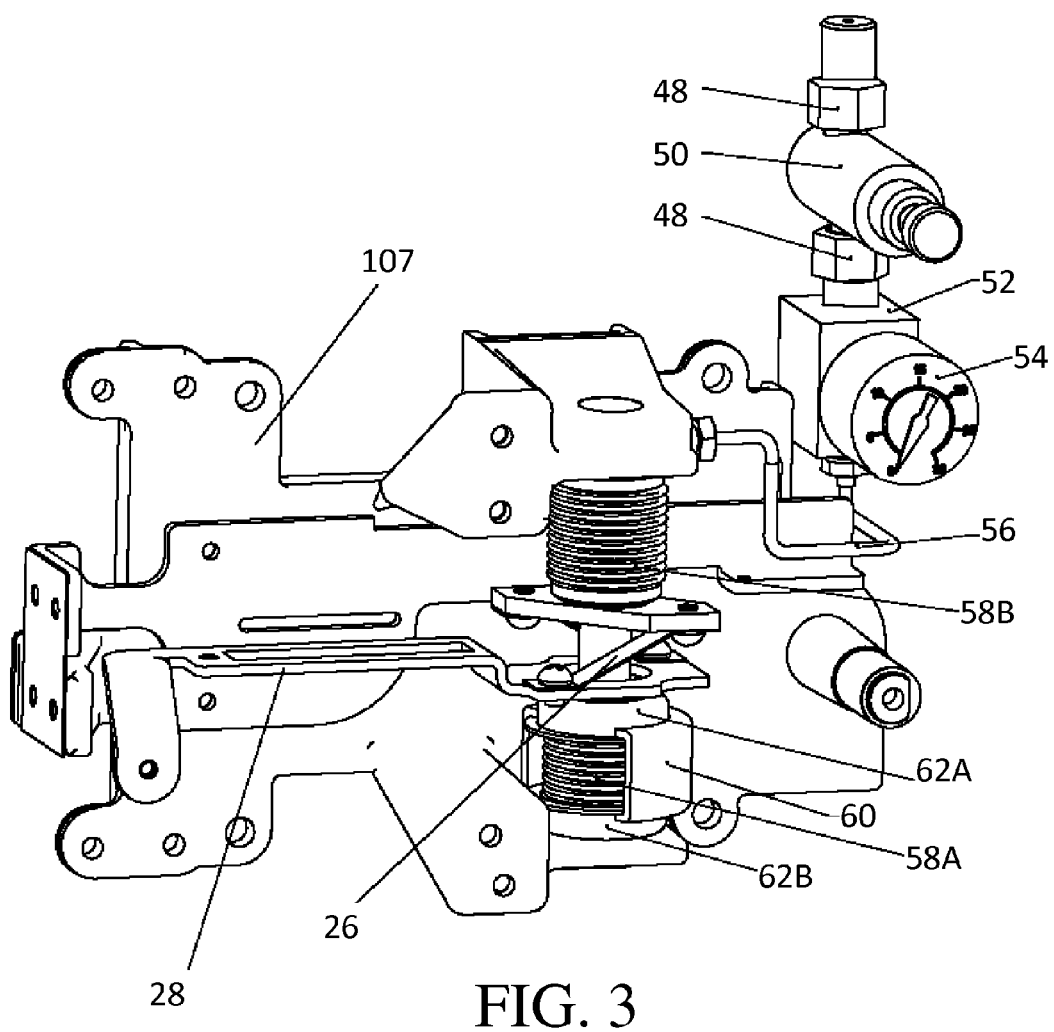
FIG. 3 is a perspective view of a proportional bellow assembly without a cantilever feedback mechanism.

FIG. 3 illustrates another alternative design where pneumatic means is used in a two bellow system whereby an opposing bellows 58A is charged with gas pressure regulated by an integrally mounted regulator 50. Regulator 50 is mounted to gauge block 52 and attached by fittings 48. Bellows 58A is maintained in position by upper bellows retaining flange 62A and lower bellows retaining flange 62B. The regulator pressure travels through output pressure tubing 56 and causes the bellows 58A to expand against an externally mounted bellows clamp 60. By adjustably regulating the charging pressure within bellows 58A a pneumatic spring is created allowing adjustable resistance of any forces introduced by the opposing bellows 58B. A pressure gauge 54 is mounted downstream of the regulator 50 on gauge block 52 to indicate the charging pressure to the resistance bellows 58A. Because the available supply pressure to the bellows 58B and the available charging pressure to the resistance bellows 58A are of equal values one would assume that when the resistance bellow 58A is charged with the maximum value available to the control loop very little movement of the two bellow assembly would occur when maximum loop pressure is introduce to bellow 58B. As well further movement could be adjusted by reducibly regulating the charging pressure in bellows 58A below that of bellows 58B. However in practical testing significant movement occurs within the assembly when full loop pressure is introduced to bellows 58B when the resistance bellow 58A is charged with equal pressure. It was concluded that in order to achieve the minimum movement requirements the charging pressure in bellows 58A would have to exceed the loop pressure in bellows 58B by a significant margin. In order to facilitate this, additional components would be required effecting the practical application of this design versus other alternatives.

Figure 4A:
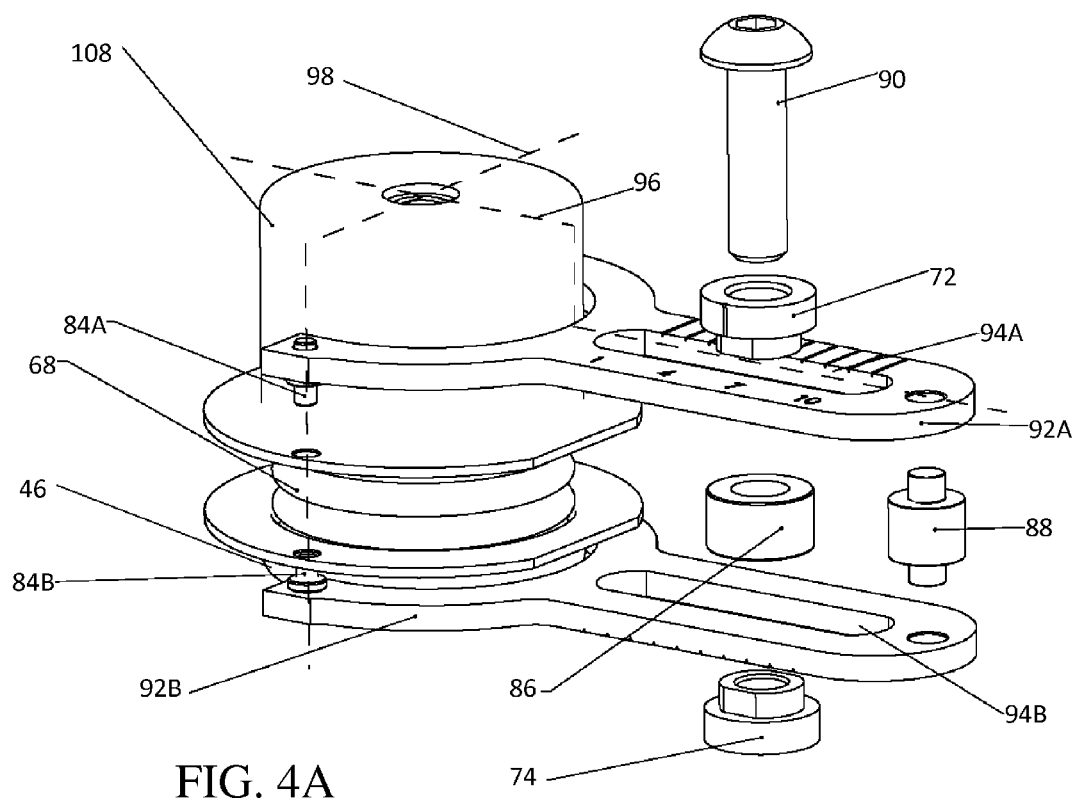
FIG. 4A is an exploded perspective view of the cantilever feedback mechanism of FIG. 1 and FIG. 1A.
Figure 4B:
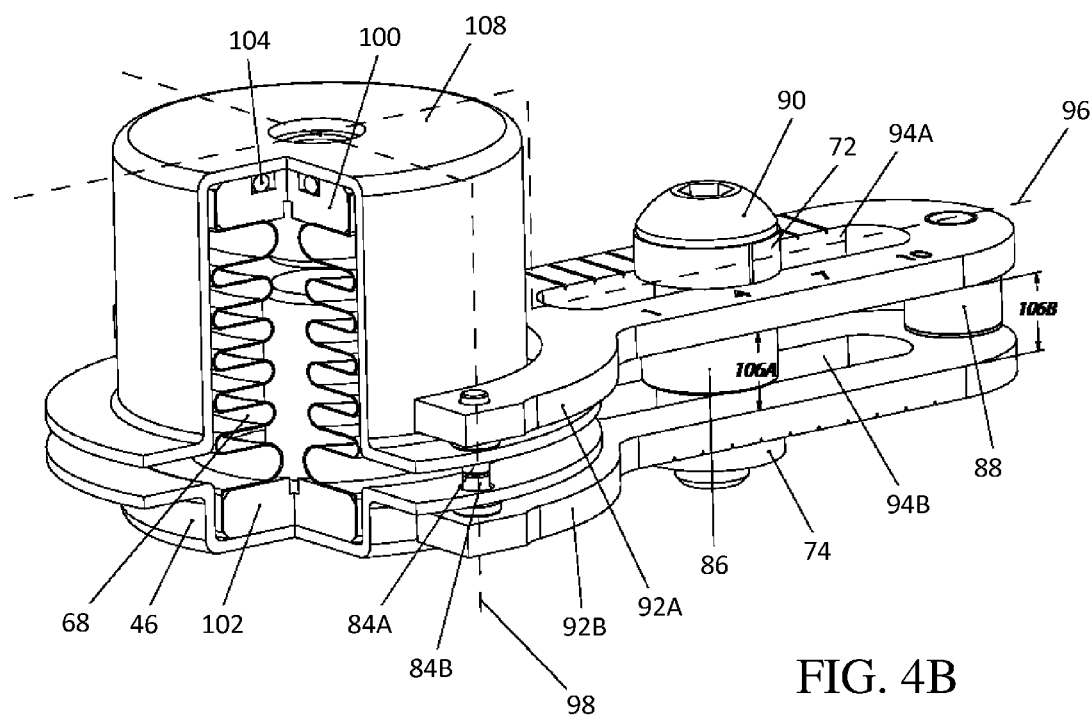
FIG. 4B is a perspective view of the cantilever feedback mechanism of FIG. 1, FIGS. 1A and 4A, engaging a bellows.

Referring to FIG. 4A and FIG. 4B, a dual cantilever spring assembly manufactured to a specific spring rate and preload to match the force created by the maximum feedback loop charging pressure within a bellows is described. Bellows 68 are movable within deep bellows cap 108 and shallow bellows cap 46. A top bellows cap 100 and a bottom bellows cap 102 are also present at the top and bottom of the bellows 68, respectively. Top bellows cap 100 contains o-ring seals which come into contact with deep bellows cap 108. It is preferred that pivot pins 84A and 84B be precisely located perpendicular to the centerline 96 of the proportional set-point adjuster assembly which includes a cap screw 90, center sleeve 86, top lock nut 72 and bottom lock nut 74 on the diametrical centerline 98 of the bellows diameter to allow resistance forces to be uniform and not change the natural linear movement of the bellows assembly. The Pivot Pins 84A and 84B are designed with a specified predetermined length so that when they touch together they act as stops against the cantilever forces in order to allow preload forces to be applied. The rear sleeve 88 and center sleeve 86 are also designed to a corresponding predetermined equal length 106A and 106B which is shorter than the combined length of the Pivot Pins 84A and 84B. When cap screw 90 is tightened, the cantilevers 92A and 92B are compressed against the center sleeve 86 and rear sleeve 88. The desired preload is achieved by calculating the preload required to achieve zero bellows movement and designing the center sleeve 86 and rear sleeve 88 to the correct length. Distance 106A and 106B will then be of equal height. One skilled in the art would understand that infinite preload and spring rate can be achieved by altering a combination of spring rate of the cantilevers 92A and 92B and preload of the assembly. The application of this design as proportional adjustment of a pneumatic feedback loop using a bellows assembly requires that the spring rate and preload of the dual cantilever assembly be designed to match the Bellows force created by the feedback loop charging pressure.

Without preload there is an inherent hysteresis due to the various contact points within the cantilever assembly. The preload solves this problem. It is required that a setting of 1 on the scale would limit the bellows to zero movement. Different settings on the scale are achieved by moving center sleeve 86 along upper cantilever slot 94A and lower cantilever slot 94B. With the cantilever assembly preloaded to a force greater than that created from the maximum feedback loop pressure this can be achieved. Through our testing we were not able achieve zero movement without pre-loading even with larger and heavier cantilevers. The relationship between the pivot pin 84A and 84B, rear sleeve 88 and center sleeve 86 dictate the amount of preload the design has. When using a larger bellows 68 or higher pressure instrument supply pressure, preload pressure can be increased by simply shortening the center sleeve 86 and rear sleeve 88. The design of the assembly operates best when both Cantilevers 92A and 92B are identical in shape and spring rate so the movement is uniform in a linear direction. During testing when non identical cantilevers were used the movement was not straight up and down due to the weaker cantilever moving more that the stronger one. This movement could be referred to as an arc rather that a straight line. The arc type movement changes the relationship of the flapper 28 and the nozzle 33 of the assembly on the horizontal plane which affects the accuracy of the set point.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The following claims are to be understood to include what is specifically illustrated and described above, what is conceptually equivalent, and what can be obviously substituted. Those skilled in the art will appreciate that various adaptations and modifications of the described embodiments can be configured without departing from the scope of the claims. The illustrated embodiments have been set forth only as examples and should not be taken as limiting the invention. It is to be understood that, within the scope of the following claims, the invention may be practiced other than as specifically illustrated and described.

What is claimed is:

1. A cantilever feedback mechanism, comprising
    an upper cantilever having a resistance spring rate to facilitate movement of a bellows over a selected range of resistances, the upper cantilever having downwardly oriented upper cantilever stops;
    a lower cantilever having a resistance spring rate to facilitate movement of the bellows over a selected range of resistances, the lower cantilever having upwardly oriented lower cantilever stops that engage the upper cantilever stops; and
    means for applying a preload to maintain the lower cantilever stops and the upper cantilever stops engaged until a force urging movement exceeds the preload.

2. The cantilever feedback mechanism of claim 1, wherein the upper cantilever and the lower cantilever are identical in shape and spring rate.

3. The cantilever feedback mechanism of claim 1, wherein the means for applying a preload is by positioning spacers between the lower cantilever and the upper cantilever at a central position and at an end remote from a bellows mounting end, the preload being determined by the length of the spacers, the spacers being shorter in length than the combined length of the upper cantilever stops and the lower cantilever stops.

4. The cantilever feedback mechanism of claim 1, wherein the resistance spring rate of the upper cantilever and the lower cantilever is adjusted by an adjuster assembly including a central spacer which is moved and fixed in positioning by loosening and tightening a fastener within a slot in both the upper cantilever and the lower cantilever to provide an adjustable resistance, the resistance being greater as the spacer is moved closer to a bellows mounting end of the upper cantilever and the lower cantilever.

5. The cantilever feedback mechanism of claim 4, wherein the upper cantilever stops and the lower cantilever stops are located perpendicular to a centerline of the adjuster assembly on a diametrical centerline of a bellows diameter of a bellows assembly to allow resistance forces to be uniform and not change a natural linear movement of the bellows assembly.

* * * * *